United States Patent
Reisz et al.

(10) Patent No.: US 10,275,828 B2
(45) Date of Patent: Apr. 30, 2019

(54) EXPANDED DATA PROCESSING FOR IMPROVED ENTITY MATCHING

(71) Applicant: Experian Health, Inc., Franklin, TN (US)

(72) Inventors: Sean Daniel Reisz, Tucker, GA (US); John Dennis, Marietta, GA (US); Matthew McCawley, Marietta, GA (US); Dimuthu A. Wijetilleke, Atlanta, GA (US)

(73) Assignee: EXPERIAN HEALTH, INC, Franklin, TN (US)

( * ) Notice: Subject to any disclaimer, the term of this patent is extended or adjusted under 35 U.S.C. 154(b) by 154 days.

(21) Appl. No.: 15/467,441

(22) Filed: Mar. 23, 2017

(65) Prior Publication Data
US 2018/0121514 A1 May 3, 2018

Related U.S. Application Data

(60) Provisional application No. 62/416,664, filed on Nov. 2, 2016.

(51) Int. Cl.
| | | |
|---|---|---|
| *G06F 17/30* | (2006.01) | |
| *G06Q 40/02* | (2012.01) | |
| *G06F 7/02* | (2006.01) | |
| *G06F 21/00* | (2013.01) | |

(52) U.S. Cl.
CPC ............. *G06Q 40/025* (2013.01); *G06F 7/02* (2013.01); *G06F 21/00* (2013.01)

(58) Field of Classification Search
CPC ......... G06Q 40/025; G06F 7/02; G06F 21/00; G06F 17/3005; G06F 17/30112; G06F 17/30554; G06F 17/30696; G06F 17/30769; G06F 17/30837; G06F 17/30941; G06F 17/30991
See application file for complete search history.

(56) References Cited

U.S. PATENT DOCUMENTS

| | | | | |
|---|---|---|---|---|
| 5,786,998 | A * | 7/1998 | Neeson | B61L 25/021 340/3.1 |
| 9,436,704 | B2 * | 9/2016 | Gershon | G06T 7/11 |
| 2003/0120652 | A1 * | 6/2003 | Tifft | G06F 17/30442 |
| 2005/0038772 | A1 * | 2/2005 | Colrain | G06F 9/5061 |
| 2007/0266037 | A1 * | 11/2007 | Terry | G06F 3/0607 |
| 2008/0120129 | A1 * | 5/2008 | Seubert | G06Q 10/06 705/35 |

(Continued)

*Primary Examiner* — Noosha Arjomandi
(74) *Attorney, Agent, or Firm* — Merchant & Gould (57) ABSTRACT

Improvements in data processing to match entities allow for more accurate records to be kept, with less memory storage used and fewer processing resources to be expended when accessing records. When receiving a request for an identifier for an entity, the request is parsed to identify various demographic fields within the request. A probabilistic search is performed to compare the entity to the candidate records that are augmented with expanded demographic data, which improve the reliability in matching the requested entity to its records. As updates are made to the external resources, the requests are rerun to update the internal resource and to eliminate any new identifiers created due to non-updated data, thus reducing data storage overhead.

18 Claims, 5 Drawing Sheets

(56) References Cited

U.S. PATENT DOCUMENTS

| | | | |
|---|---|---|---|
| 2012/0290950 A1* | 11/2012 | Rapaport | H04L 51/32 715/753 |
| 2013/0054570 A1* | 2/2013 | Gonzales | G06F 21/6218 707/722 |
| 2013/0073449 A1* | 3/2013 | Voynow | G06Q 30/0601 705/39 |
| 2013/0339314 A1* | 12/2013 | Carpentier | G06F 3/0641 707/692 |
| 2016/0283520 A1* | 9/2016 | Yamaji | G06F 17/30268 |
| 2017/0111372 A1* | 4/2017 | Jamaa | G06F 21/6218 |
| 2017/0132234 A1* | 5/2017 | Mehta | G06F 17/3087 |
| 2018/0102936 A1* | 4/2018 | Curtis | H04L 41/06 |

* cited by examiner

EXPANDED DATA PROCESSING FOR IMPROVED ENTITY MATCHING

RELATED APPLICATIONS

The present disclosure claims priority to U.S. Provisional Patent Application No. 62/416,664 filed Nov. 2, 2016, the disclosure of which is hereby incorporated by reference in its entirety.

BACKGROUND

Several industries use various entity matching technologies to uniquely identify entities. However, when a person moves or changes a last name (e.g., due to marriage or divorce), for example, it becomes challenging to link those two "people" together and confirm that they are one person. In previous systems, social security numbers or other governmental identification numbers have helped in creating confidence in whether two entities with different demographic data are, in fact, one entity, but these identifiers are not always reliable, and the availability of some identifiers in records, such as, social security numbers, has decreased due to security and privacy concerns. Additionally, data entry errors add to the challenge, as the entered identifiers may include typographical errors and therefore cannot be relied upon.

SUMMARY

Aspects of methods and systems for allowing referential data to improve entity matching are provided herein. In response to receiving a request for an identifier for an entity, the system parses the request to identify various demographic fields within the request. The system then sanitizes and standardizes the demographic fields data in the request to increase data consistency and perform a search in both internal and external resources to find candidate matching entities and their records. If the number of candidate matching entities are deemed insufficient or excessive, indicating that the results cannot be reliably matched to one entity in a reasonable period of time, the demographic field(s) used to locate candidate records are changed and the search to locate the candidate records containing the demographic data is performed again in the internal and external demographic data resources. A probabilistic search is performed to compare the entity to the candidate records and a score is attached to each comparison. The unique identifier for the record with the highest probabilistic score is returned to the requestor to identify that entity uniquely, reliably, and securely. If no records match the request, or their values fall below a confidence threshold, a new unique identifier is created and assigned for the entity, as the system has determined that the request is the first time it has interacted with the given entity. The identifier is then returned to the requestor. As updates are made to the external resources, in various aspects, the requests are rerun in order to update the internal resource and to eliminate any new identifiers created due to non-updated data.

Improvements in data processing to match entities allow for more accurate records to be kept, with less memory storage used and fewer processing resources to be expended when accessing records. When receiving a request for an identifier for an entity, the request is parsed to identify various demographic fields within the request. A probabilistic search is performed to compare the entity to the candidate records that are augmented with expanded demographic data, which improve the reliability in matching the requested entity to its records. As updates are made to the external resources, the requests are rerun to update the internal resource and to eliminate any new identifiers.

BRIEF DESCRIPTION OF THE DRAWINGS

Further features, aspects, and advantages of the invention represented by the examples described in the present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

Aspects of methods, systems, and computer readable storage devices embodying instructions for allowing referential data to improve entity matching are provided herein. In response to receiving a request for an identifier for an entity, the system parses the request to identify various demographic fields within the request. The system then sanitizes and standardizes the demographic fields data in the request to increase data consistency and perform a search in the internal and external resource to find the probable matching entities. The demographic fields in the request are compared to an internal or external demographic data resource to locate candidate records. If the identified candidate records are insufficient or excessive, the demographic field or its combination, used to locate candidate records, is changed and the search to locate the candidate records containing the demographic data is performed again in the internal and external demographic data resources.

A probabilistic search is performed to compare the entity to the candidate records and a score is attached to each comparison. The unique identifier to the record with the highest probabilistic score is returned to the requestor. If no records match the request, a new unique identifier is created and assigned to the entity. The identifier is then returned to the requestor. As updates are made to the external resources, the requests are rerun in order to update the internal resource and to eliminate any new identifiers created due to non-updated data.

Figure 1:
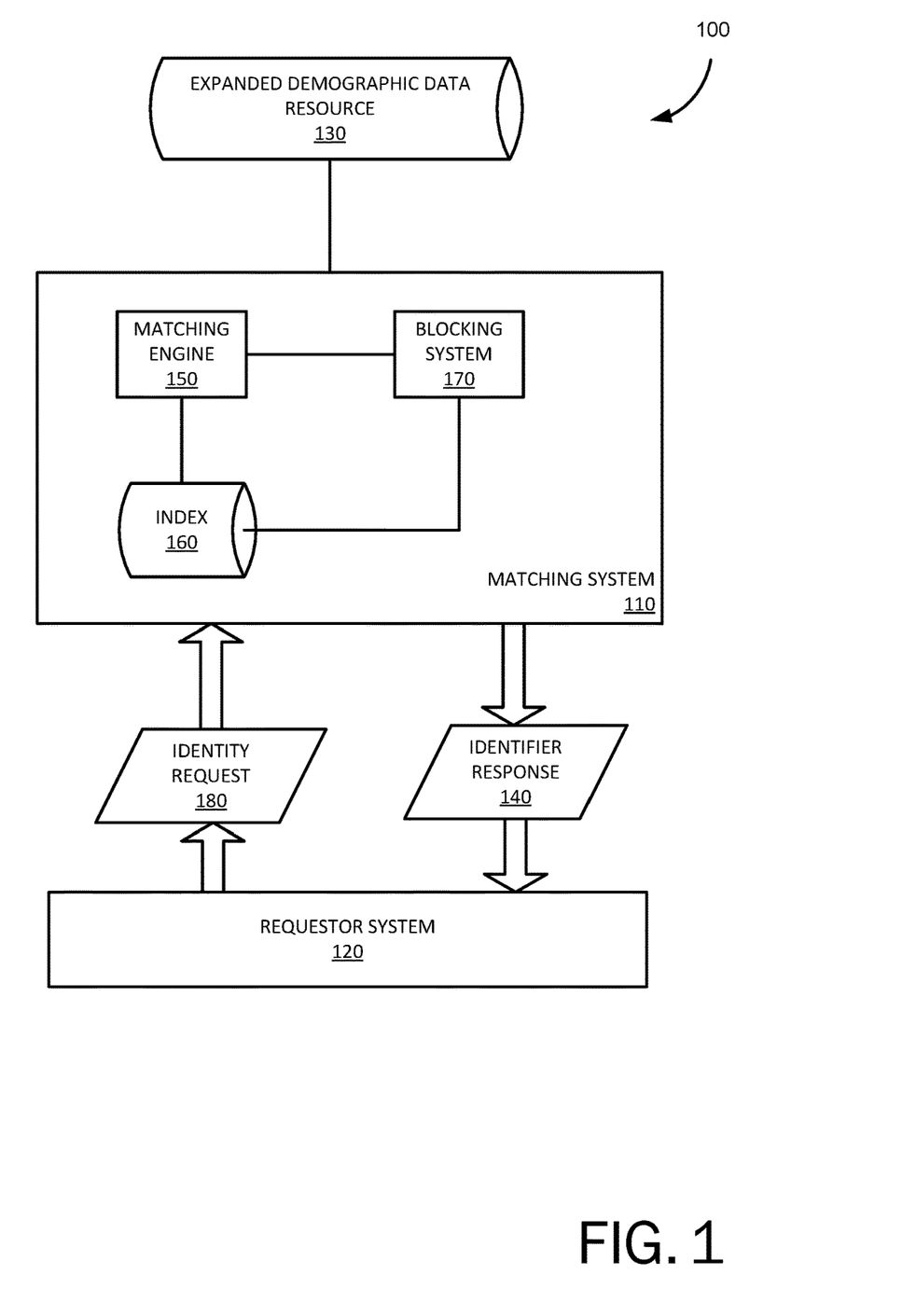
FIG. 1 illustrates an example operating environment in which expanded data processing for improved entity matching may be performed.

FIG. 1 illustrates an example operating environment 100 in which expanded data processing for improved entity matching may be performed. A matching system 110 communicates with a requestor system 120 and an expanded demographic data resource 130 to provide the requestor system 120, which has sent an identity request 180 for an entity, with a unique identifier for that entity with improved accuracy and reliability in the matching process.

Figure 5:
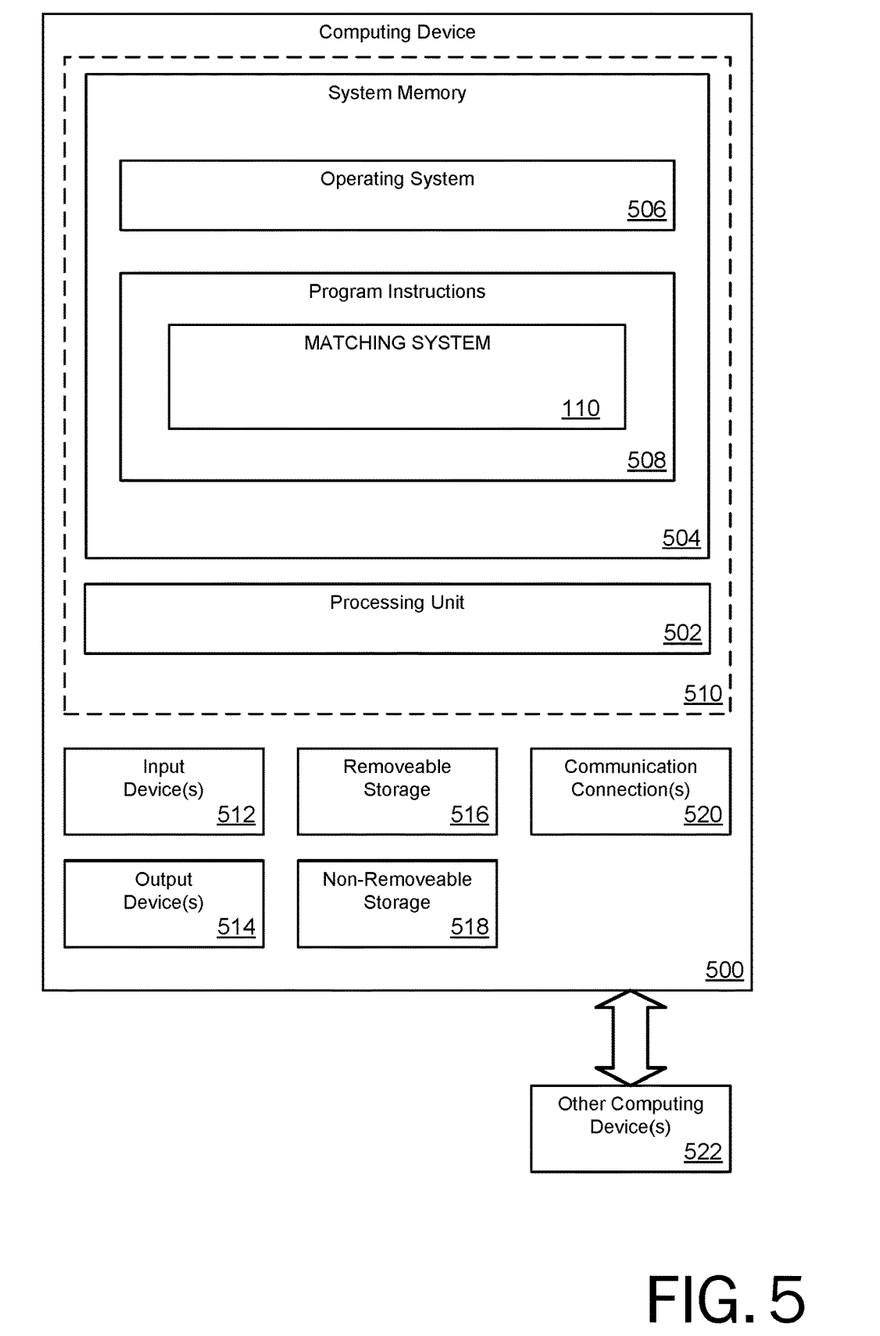
FIG. 5 is a block diagram illustrating example physical components of a computing device with which aspects of the system may be practiced.

The matching system 110, the requestor system 120, and the expanded demographic data resources 130 are illustrative of a wide variety of computing devices, the hardware of which is discussed in greater detail in regard to FIG. 5. The computing devices include, but are not limited to: servers, desktop computers, laptops computers, tablets, smart phones, personal digital assistants, and distributed systems that are run on multiple computing devices. In various aspects, the matching system 110, the requestor system 120, and the expanded demographic data resources 130 are in communication with one another via the Internet, a private network, or a virtual private network or tunnel over a public network, which may include wired and wireless components to link systems that are located remotely from each other.

The matching system 110 is operable to receive identity requests 180 from requestor systems 120 that are remote or local to the computing environment in which the matching system 110 is operated. The identity requests 180 include several fields of demographic data, which may include more or fewer fields than are present in the demographic data sources available to the matching system 110 or may be unreliable (e.g., due to human entry errors). For example, a requestor who submits the identity request 180 may not include a demographic field for an entity's address, whereas the matching system 110 maintains or has access to demographic data related to the entity's address. Similarly, a requestor system 120 may include a demographic field in the identity request 180 (e.g., height, weight, eye color, schools attended, customer number) for which the matching system 110 does not maintain or have access to.

The matching system 110 is operable to select the demographic fields for which it does have access to in its data sources from the identity request 180, and determine whether the demographic data in the identity request 180 are reliable and to standardize those data. For example, demographic data may be standardized to include a given capitalization scheme for letters (e.g., all uppercase, all lowercase, leading uppercase), to standardize known nicknames to their full forms, to format dates according to one style (e.g., 1-Oct-2020; Oct. 1, 2020; 10/1/20; into: 20201001), to remove street markers from addresses (e.g., North, South, Street, Blvd, Circ.), etc. In another example, demographic data that exhibit known patterns of unreliability are sanitized so that they are discarded or ignored (i.e., treated as though the requestor omitted them), such as, for example, governmental identification numbers or phone numbers that are all the same digit, known placeholder values (e.g., "John Doe/ Jane Roe" or "Baby Girl/Boy" as a name, 123-45-6789 as a social security number, 987-555-1234 as a phone number), fields that are recognized as incomplete (e.g., an address without a street number and/or street name, a date of birth without a year), etc.

The standardized and sanitized demographic data from the identity requests 180 are processed by the blocking system 170 to develop sets or blocks of candidate entities that share some or all of those demographic data fields from various entities stored in the index 160 as well as the expanded demographic data received from the expanded demographic data resource 130. The expanded demographic data and the demographic data stored for the entity in the index 160 are grouped by the blocking system 170 into candidate sets according to various groupings of matching data fields for the matching engine 150 to analyze. Each of the blocks includes the entities whose demographic data match one or more specified fields. For example, two entities with the first name of "Mary" and the last name of "Jones," but with different values for fields related to date of birth, address, governmental identification number (e.g., social security number, driver's license number, taxpayer identifier, unique identifier), etc., may be included in a block for first and last name fields as candidate entities to match a identity request 180 that includes a first name of "Mary" and a last name of "Jones."

The data retrieved from the index 160 are associated with identifiers that are unique to each entity previously observed by the matching system 110, and are augmented with data from the expanded demographic data resource 130 to provide additional details on historic demographic data. In various aspects the expanded demographic data resource 130 is a computer system for a credit agency (e.g., providing credit header data for an entity's demographics), for a commercial entity (e.g. providing consumer shipping or loyalty program details for an entity's demographics), or for a governmental agency (e.g., providing official records for an entity's demographics). Although examples are given primarily in terms of human persons, it will be understood that entities include non-human persons (e.g., corporations, partnerships, agencies), animals, and inanimate objects (e.g., vehicles).

The matching engine 150 examines the candidate sets, or blocks, to determine whether they include a reasonable amount of results to analyze, and whether any of those results satisfy a confidence threshold in matching the entity presented in the identity request 180 to an entity whose records are stored in the index 160. For example, if a block contains no candidate entities or a number of entities below another threshold number, the blocking system 170 is signaled to reduce the number of demographic fields that must be matched between the identity request 180 and the data sources. In another example, if a block contains too many candidate entities according to a threshold (e.g., 1000, 10000, 100000, etc., candidates), the blocking system 170 is signaled to increase the number of demographic fields that must be matched between the identity request 180 and the data sources.

Once a block of candidate entities is returned with a sufficient number of candidate entities to examine (e.g., at least one), the matching engine 150 is operable to determine whether one or more of those candidate entities provide enough data in their demographic fields—matched or unmatched to the data in the identity request 180—for at least one candidate entity to satisfy a confidence threshold that the entity in the identity request 180 is the same entity as in the demographic data stored in the index 160 or received from the expanded demographic data resource 130.

Various aspects allow for various confidences to be determined between two sets of records as to whether they refer to the same entity. For example, two systems that receive an identity request 180 with demographic data for "John" "Doe" "123 Main Street" "Born: 1-1-1950" may match the entity described in the identity request 180 to an entity for "Johnathan" "Doe" "122 Main Street" "Born: 1-1-1950" and "John" "Roe" "123 Main Street" "Born: 1-2-1950" respectively based on different weights assigned to different fields when comparing the demographic data.

In aspects where more than one entity satisfies the confidence threshold, the candidate entity with the highest confidence score is selected as the match. In aspects where no entity stored in the index 160 matches the entity whose demographic data are provided in the identity request 180, the matching system 110 will create a new identifier for that entity. Some or all of the data from the identity request 180 and the expanded demographic data used to augment the data stored in the index 160 for the entity (if the entity was previously stored in the index 160) are associated with the identifier in the index 160 for later matching attempts. When the indexed data are augmented with the expanded demographic data, the demographic data fields for a given entity are expanded to include prior values for those fields that have been noted by the third party who supplied the expanded demographic data. For example, when an expanded demographic data resource 130 has data for other names or aliases, addresses, national identification numbers, etc., that have been used by an entity, those other data are used in addition to the indexed data for the entity. The expanded data include historical data (e.g., a maiden name), data that have been updated more recently than what has been seen by the matching system 110 (e.g., a married name when the maiden name is indexed), misspellings/mis-entries of data fields that have been submitted to the expanded demographic data resource 130, and other variations to fields data that occur over time for an entity.

The identifier that is returned for an existing entity in the index 160 or created for a new entity that is added to the index 160 in response to the identity request 180 is returned to the requesting system 120 via an identifier response 140. In various aspects, the identifier response 140 includes the unique identifier for the entity whose identifier was requested in the identity request 180, as well as other information to allow the requestor system 120 to correlate the identifier response 140 to the identity request 180 that initiated the entity matching.

Figure 2:
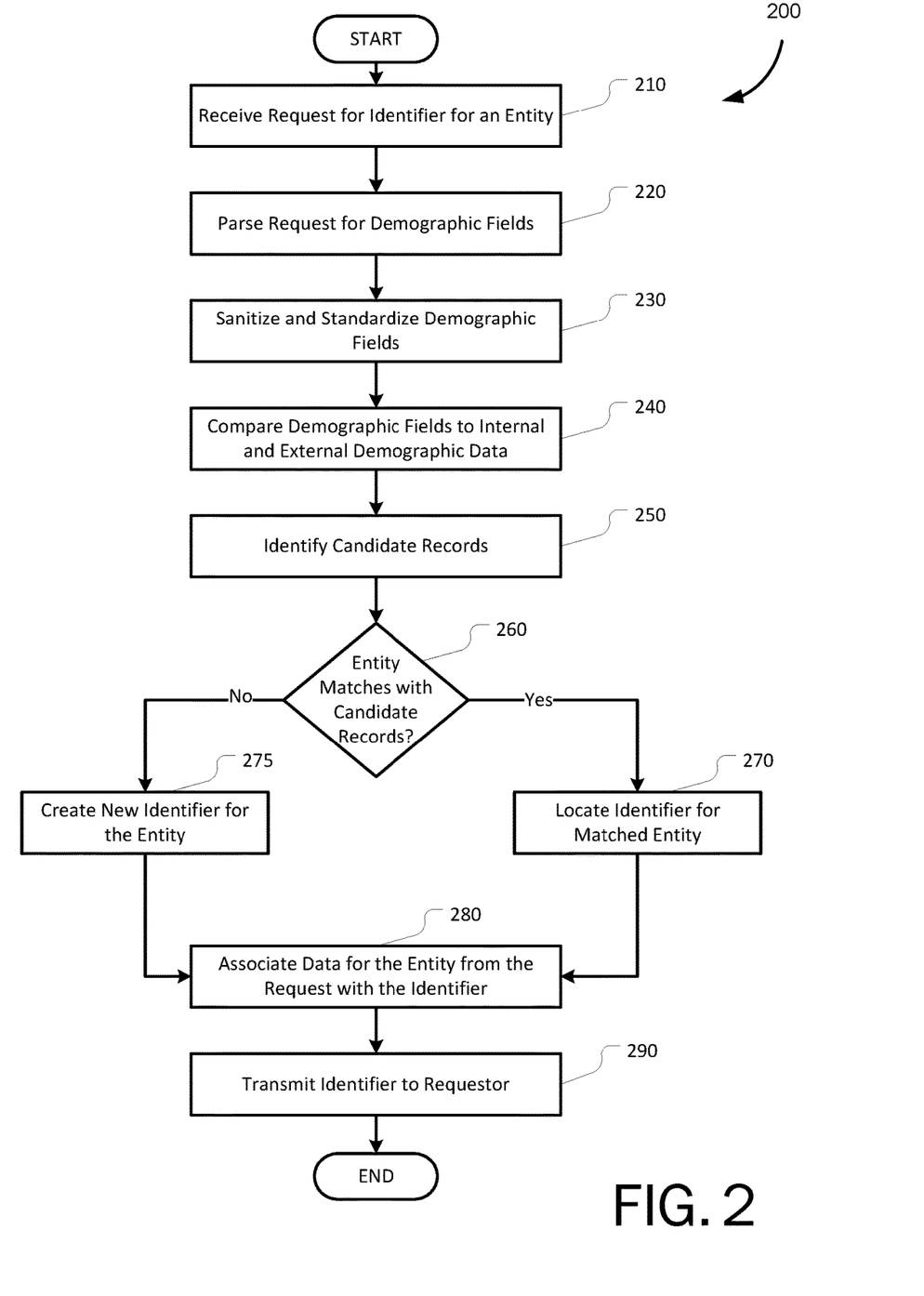
FIG. 2 is a flow chart showing general stages involved in an example method for the matching system.

FIG. 2 is a flow chart showing general stages involved in an example method 200 for the matching system 110. Method 200 starts at OPERATION 210, where the matching system 110 receives a request for an identifier for an entity. The request may be received from an external requestor or an internal requestor. The system then parses the request at OPERATION 220 to identify demographic fields data in the request that are operable to identify the entity, such as, for example: first name, last name, middle initial, address, governmental identification number, date of birth, etc.

Method 200 then proceeds to OPERATION 230, where the system sanitizes and standardizes the demographic fields in the request. In various aspects, sanitization of the demographic field comprises deleting known-unreliable record fields. For example, if the value of a social security number for an entity is 000-00-0000, which is recognized as an invalid social security number, it is not considered to be part of the request or added to the entity's records; it is treated as blank or null. In another example, if the value of a first name for an entity were "baby girl", which is recognized as a placeholder value used by some medical facilities to refer to unnamed newborn girls, it is not considered to be a part of the request and will not be added to the entity's records as a valid value for the first name field. In various aspects, standardization of the demographic fields data comprises formatting the requesting demographic data field to make it consistent with the data stored in the index 160. For example, if the value of the address field were "125 N Elm", it may be changed to "125 ELM", wherein the "N" indicating North from the address field is deleted and the case of the street name is standardized to all caps to improve consistency between data fields received in different requests or data sources. In another example, the words or abbreviations for street, boulevard, avenue, etc., are also removed from the address field since they may be entered in a plurality of ways which may increase inconsistency between records.

The method 200 then proceeds to OPERATION 240, where the matching system 110 compares the demographic fields from the request to the demographic fields in the internal and external demographic data resources. In various aspects, the system uses different combinations of the demographic fields based on set algorithms to develop sets or blocks of candidate records at OPERATION 250, which is described in greater detail with respect to FIG. 3.

Once the candidate records are identified, the system proceeds to DECISION OPERATION 260, where it is determined which candidate record from the index 160 (if any) is identified as matching to the entity in the request. DECISION OPERATION 260 is described in greater detail with respect to FIG. 3.

If at DECISION OPERATION 260, a particular candidate record is identified as matching the entity in the request, method 200 proceeds to OPERATION 270, where the unique identifier associated with the matched record is located. If at DECISION OPERATION 260, no candidate record is identified as matching the entity in the request, method 200 proceeds to OPERATION 275, where a new unique identifier is created for the entity and added to the index 160 with the demographic data from the identity request 180 associated with that newly created identifier.

At OPERATION 280, the data associated with the entity from the identity request 180 are associated with the located or created identifier associated with the entity's records, and the corresponding identifier is transmitted to the requestor system 120 at OPERATION 290. Method 200 then concludes.

Figure 3:
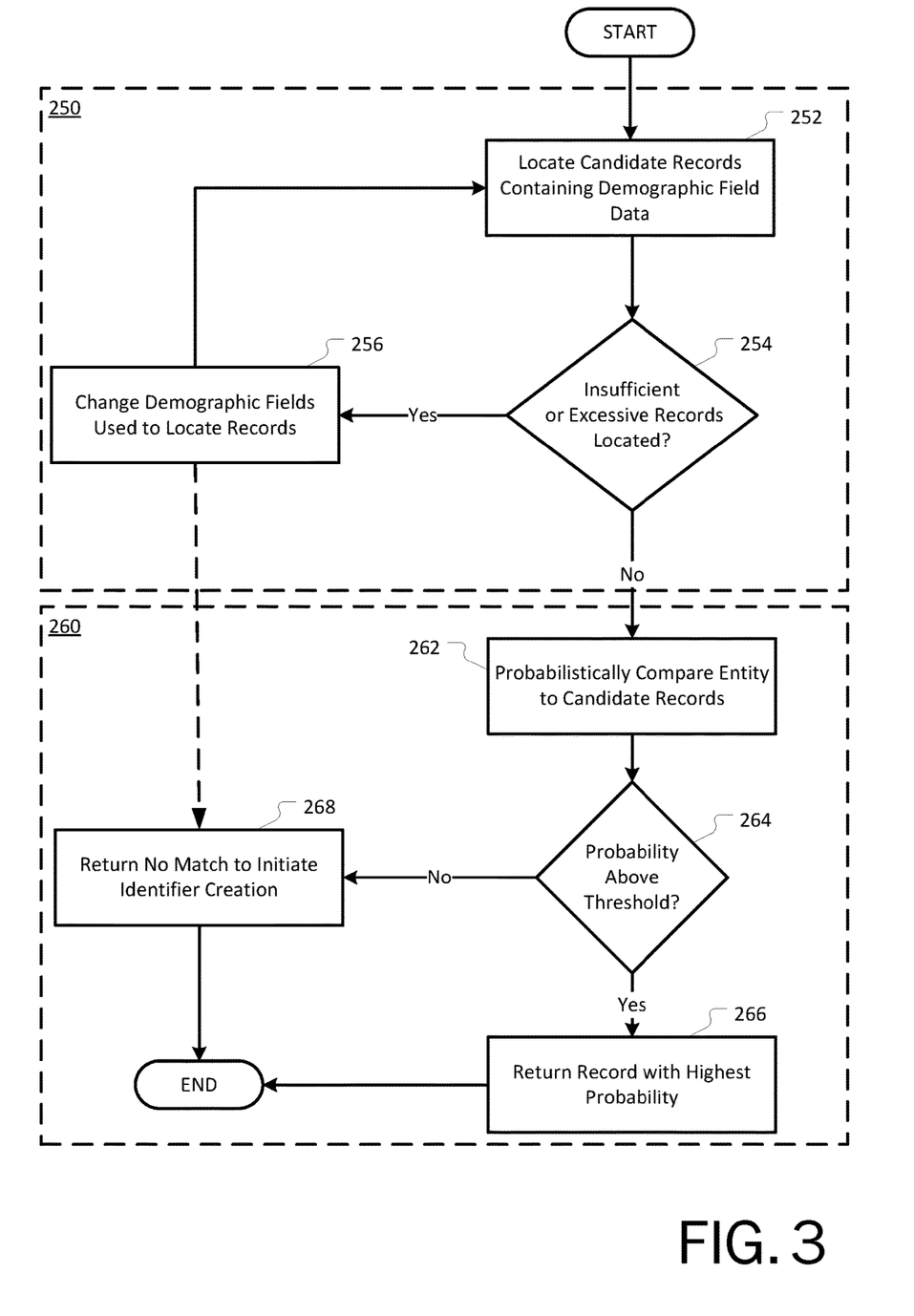
FIG. 3 is a flow chart showing in further depth the general stages involved in the example method of the matching system from FIG. 2.

FIG. 3 is a flow chart showing further detail the general stages involved in OPERATIONS 250 and 260 from method 200 discussed in relation to FIG. 2.

In OPERATION 250 the candidate records are identified. OPERATION 250 begins with SUB-OPERATION 252, where candidate records are located that contain demographic fields data that are included in the identity request 180, based on the comparisons performed at OPERATION 240. At DECISION OPERATION 254 it is determined whether the number of records located at SUB-OPERATION 252 is either insufficient or excessive.

For example, if the demographic field(s) chosen to perform the search in the internal and external demographic data resources uses a combination of first name and address, but the identity request 180 provides a common first name (e.g., "Mary") and an address that happens to be an address belonging to a large organization (e.g., a gym that use its address when members do not supply their own), hundreds of records may be returned. Such candidate records results are considered excessive, and the OPERATION 250 proceeds to SUB-OPERATION 256, where a change may be made in the demographic field(s) used to perform the search to locate candidate records. In another example, if the demographic fields chosen to perform a search in the internal and external demographic data resources are a combination that yields no candidate records, the number of records located will be determined to be insufficient, and OPERATION 250 will also proceed to SUB-OPERATION 256 to attempt to locate records via a different combination of demographic fields.

OPERATION 250 selects a different selection of demographic fields at SUB-OPERATION 256 and returns to SUB-OPERATION 252 where candidate records may be located with the new demographic field(s). If all of the combinations of demographic fields have already been attempted, SUB-OPERATION 256 proceeds to SUB-OPERATION 268.

In DECISION OPERATION 260, it is determined which candidate record is identified as matching to the entity in the request. When a set of candidate records are identified at OPERATION 250, method 200 probabilistically compares the entity in the identity request 180 at DECISION OPERATION 260 to each of the candidate records starting with SUB-OPERATION 262. In one aspect, a score is associated with each candidate record based on its matching probability. For example, if the date of birth, social security number, and first and last name were matched successfully with a candidate record, it will have a higher matching score compared to a candidate record where date of birth and last name were matched, but the social security number and first name were not matched. As will be appreciated, different aspects may apply different weights to exact matches, near-misses, and large-misses in matching various demographic data fields. In various aspects, near-misses are inexact matches that include character differences that fall below a threshold (e.g., no more than n characters different between two fields) to account for typographical, spelling, transposition, and transcription informalities. For example "Msry" or "Mray" may be considered near-misses for "Mary" according to a character difference threshold for one informality (typographical and transposition, respectively), whereas "John" or "Msrt" would be considered as large-misses for "Mary" in the current example.

At DECISION OPERATION 264, a determination is made as to whether the score satisfies a pre-determined threshold value to identify records that the system is confident refer to the same entity. If multiple entities are discovered with scores satisfying the threshold, the entity whose candidate score is the highest is returned at SUB-OPERATION 264. For example, a match with a lower difference in non-matching demographic fields (e.g., a typo in a name) may be given a higher score relative to a match with major differences in non-matching demographic fields (e.g., a different name).

If at DECISION OPERATION 264 it is determined that no candidate entity has a confidence score satisfying the predetermined threshold, OPERATION 260 proceeds to SUB-OPERATION 268 and returns that no matching entity was found in the index 160, which initiates the creation of a new identifier for that unmatched entity.

Figure 4:
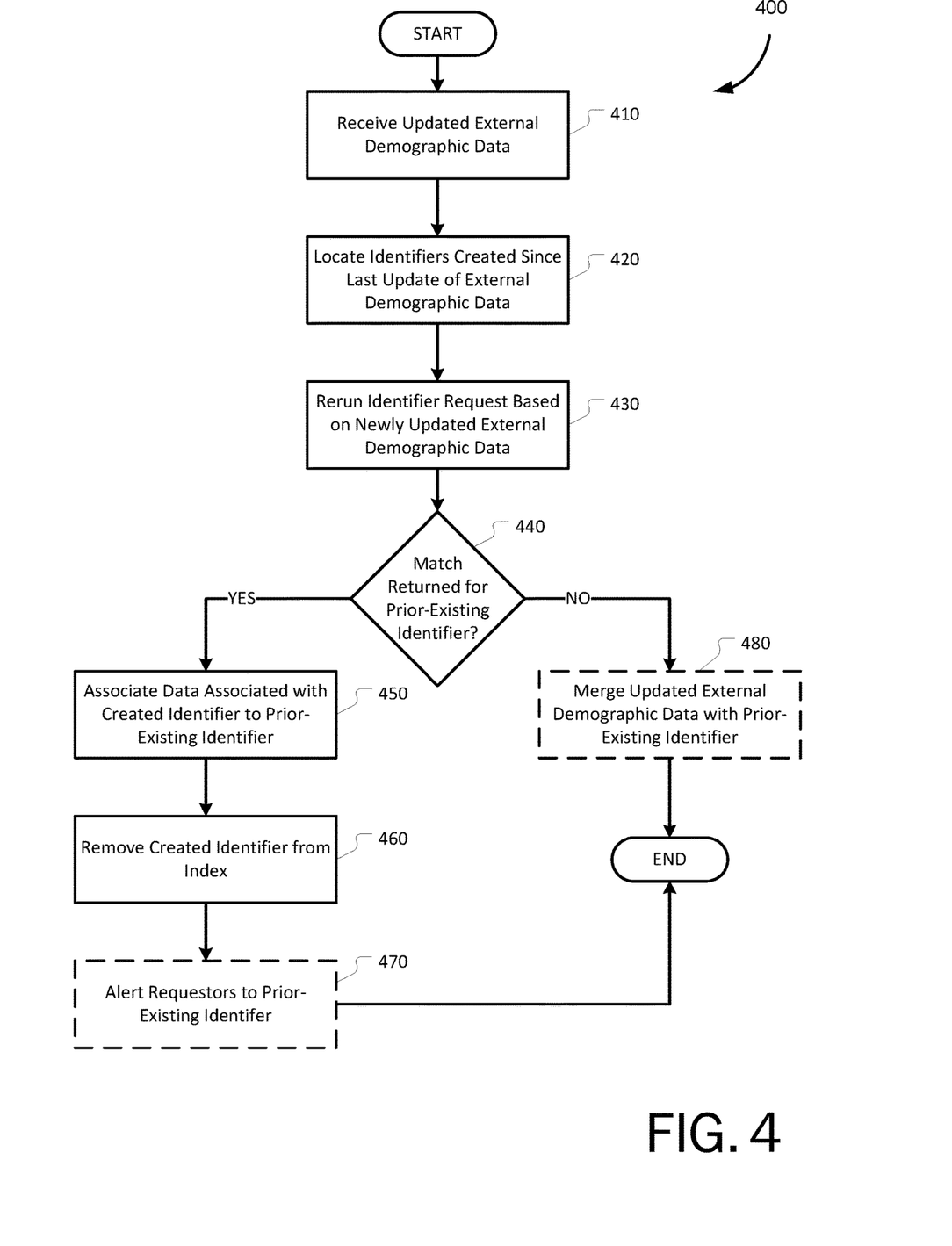
FIG. 4 is a flow chart showing general stages involved in an example method for performing a re-match in the matching system.

FIG. 4 is a flow chart showing general stages involved in an example method 400 for performing a re-match in the matching system 110. Method 400 begins at OPERATION 410, where an update to the expanded demographic data is received. In one aspect, the update to the expanded demographic data is received at a pre-determined time interval, for example, daily, weekly, monthly, quarterly, semi-annually, annually, etc. In another aspect, the update to the expanded demographic data is received upon request. For example, for a certain entity for which the requestor requires the highest level of confidence in matching its demographic data, the requestor may request an update prior to the match being attempted.

At OPERATION 420, the matching system 110 locates the unique identifiers created since the last update of the expanded demographic data and at OPERATION 430, the matching system 110 reruns the matching request performed via method 200 for all the newly created unique identifiers that were located in OPERATION 420. For example, if a matching request were received and processed for a "Mary Jones" living at "125 Bluff Street" for which no match was initially found and a new unique identifier was therefore created, the matching system 110 will rerun the matching request for that entity ("Mary Jones" living at "125 Bluff Street") to determine whether the newly received expanded demographic data would have returned a match had it been available when the initial identity request 180 for that entity was received.

At DECISION OPERATION 440, a determination is made whether the matching system 110 has now found a match after the update, when a match was not found with non-updated expanded demographic data.

If a match is found at DECISION OPERATION 440, the updated data received from the updated expanded demographic data and data associated with the newly created identifier are added to the matched record at OPERATION 450; merging the records into the older, prior-assigned identifier. The method 400 then proceeds to OPERATION 460 where the new identifier associated with the request is made inactive or removed, to prevent one entity from being actively associated with multiple identifiers in the system. In various aspects, the matching system 110 retains the inactive/removed identifier to forward requests that use the inactive/removed identifier to the records associated with the prior-assigned identifier and/or to ensure that the inactive/removed identifier is not assigned to a different entity. Method 400 optionally proceeds to OPERATION 470 to transmit an alert to notify the requestors that received an inactive/removed identifier of the newly run matching request that returned a positive match for a prior-existing identifier, and optionally provides them with the prior-assigned identifier that is now associated with the entity. Method 400 then concludes.

If at DECISION OPERATION 440, a determination is made that the matching system 110 still found no matches for prior-existing identifiers in the request after the update to the expanded demographic data (besides any records associated with the newly created identifier) the matching system 110 determines whether any of the newly updated expanded demographic data relates to entities whose records are stored in the system. At optional OPERATION 480, the updated data from the expanded demographic data are merged into the records associated with corresponding identifiers stored in the system. For example, if the update in the expanded demographic data were to include a new value for a demographic field, such as a new address, assigned to a "John Smith" who is associated with an identifier in the system, the new value would then be associated with the unique identifier for that "John Smith" at optional OPERATION 480 to keep the records for "John Smith" up to date.

In one aspect, the system may rerun the matching request performed via method 200 for all the requests received and processed since the last update of the expanded demographic data—regardless of whether they resulted in a new identifier being created. By rerunning the matching request for all the received and processed requests, the matching system 110 updates the records in the index 160 via optional OPERATION 480. For example, a matching request was received and processed for an entity associated with demographic data of "Mary Jones" living at "125 Bluff Street" in which a match was found and the prior-existing identifier was sent to the requestor. During the update, if the records in the expanded demographic data were to provide an indication that the name of the entity has changed from "Mary Jones" to "Mary Edwards," that new name is included in the index 160 by merging the name data from the updated expanded demographic data into the entity's records in the index 160. Updating the index 160 ensures that if an identity request 180 for a "Mary Edwards" living at "125 Bluff Street" is received at a time after the index 160 is updated, a higher confidence score can be attached to the match to provide the identifier associated with the entity known as "Mary Edwards" or "Mary Jones." Method 400 then concludes.

FIG. 5 is a block diagram illustrating physical components of an example computing device with which aspects may be practiced. The computing device 500 may include at least one processing unit 502 and a system memory 504. The system memory 504 may comprise, but is not limited to, volatile (e.g. random access memory (RAM)), non-volatile (e.g. read-only memory (ROM)), flash memory, or any combination thereof. System memory 504 may include operating system 506, one or more program instructions 508, and may include sufficient computer-executable instructions for a 1080p system, which when executed, perform functionalities as described herein. Operating system 506, for example, may be suitable for controlling the operation of computing device 500. Furthermore, aspects may be practiced in conjunction with a graphics library, other operating systems, or any other application program and is not limited to any particular application or system. This basic configuration is illustrated by those components within a dashed line 510. Computing device 500 may also include one or more input device(s) 512 (keyboard, mouse, pen, touch input device, etc.) and one or more output device(s) 514 (e.g., display, speakers, a printer, etc.).

The computing device 500 may also include additional data storage devices (removable or non-removable) such as, for example, magnetic disks, optical disks, or tape. Such additional storage is illustrated by a removable storage 516 and a non-removable storage 518. Computing device 500 may also contain a communication connection 520 that may allow computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules, may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media do not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for improving reliability in entity matching, comprising:
   receiving, at an entity matching system, a request for an identifier associated with an entity;
   parsing the request for requesting demographic fields data related to the entity;
   retrieving records that include indexed demographic data, wherein at least one of the indexed demographic data for each record retrieved matches a corresponding field from the requesting demographic fields data;
   augmenting the indexed demographic data with expanded demographic data, wherein the expanded demographic data are received from a third party;
   determining a matching confidence for whether the entity is associated with a given record of the records based on the requesting demographic fields data that match the indexed demographic data as augmented by the expanded demographic data;
   in response to the matching confidence satisfying a threshold, selecting a prior-assigned identifier that is associated with the given record as the identifier for the entity;
   in response to the matching confidence not satisfying the threshold, creating a new identifier as the identifier for the entity;
   transmitting the identifier to the requestor; and
   in response to receiving updated expanded demographic data:
      locating the new identifier;
      retrieving demographic data related to the new identifier;
      retrieving existing records that include prior-indexed demographic data, wherein at least one of the prior-indexed demographic data for each existing record retrieved matches a corresponding field from the demographic data related to the new identifier;
      augmenting the prior-indexed demographic data with the updated expanded demographic data;
      determining an updated matching confidence for whether the entity is associated with a prior-existing identifier based on the demographic data related to the new identifier that match the prior-indexed demographic data as augmented by the updated expanded demographic data; and
      in response to the updated matching confidence satisfying the threshold:
         selecting the prior-existing identifier as the identifier for the entity;
         associating the demographic data related to the new identifier with the prior-existing identifier; and
         removing the new identifier from an identifier index.

2. The method of claim 1, wherein the third party is a credit agency and the expanded demographic data are received in a credit header.

3. The method of claim 1, further comprising, in response to the updated matching confidence not satisfying the threshold:
   determining whether the updated expanded demographic data are related to the given record associated with the prior-assigned identifier; and
   in response to determining that the updated expanded demographic data are related to the given record associated with the prior-assigned identifier, merging the updated expanded demographic data related to the given record associated with the prior-assigned identifier into the given record.

4. The method of claim 1, further comprising, in response to removing the new identifier from the identifier index:
   alerting the requestor to the entity being associated with the prior-existing identifier.

5. The method of claim 1, wherein the expanded demographic data are periodically updated.

6. The method of claim 1, wherein the indexed demographic data include fields for each indexed entity of:
   a first name;
   a last name;
   an address;
   a governmental identification number; and
   a date of birth.

7. The method of claim 6, wherein the demographic fields data omit one or more of the fields included in the indexed demographic data.

8. The method of claim 1, further comprising:
   standardizing the demographics fields data to a format used by the indexed demographic data; and
   sanitizing the demographics fields data to remove data fields whose values correspond to known invalid values.

9. A system for improving reliability in entity matching, comprising:
   a processor; and
   a memory storage device including instructions that when executed by the processor are operable to:
      receive, from a requestor system, a request for an identifier associated with an entity;
      parse the request for requesting demographic fields data related to the entity;
      retrieve records that include indexed demographic data, wherein at least one of the indexed demographic data for each record retrieved matches a corresponding field from the requesting demographic fields data;
      augment the indexed demographic data with expanded demographic data, wherein the expanded demographic data are received from a third party;
      determine a matching confidence for whether the entity is associated with a given record of the records based on the requesting demographic fields data that match the indexed demographic data as augmented by the expanded demographic data;
      in response to the matching confidence satisfying a threshold, select a prior-assigned identifier that is associated with the given record as the identifier for the entity;
      in response to the matching confidence not satisfying the threshold, create a new identifier as the identifier for the entity;
      transmit the identifier to the requestor; and
      in response to receiving updated expanded demographic data:
         locate the new identifier;
         retrieve demographic data related to the new identifier;
         retrieve existing records that include prior-indexed demographic data, wherein at least one of the prior-indexed demographic data for each existing record retrieved matches a corresponding field from the demographic data related to the new identifier;
         augment the prior-indexed demographic data with the updated expanded demographic data;
         determine an updated matching confidence for whether the entity is associated with a prior-existing identifier based on the demographic data related to the new identifier that match the prior-indexed demographic data as augmented by the updated expanded demographic data; and in response to the updated matching confidence satisfying the threshold:
select the prior-existing identifier as the identifier for the entity;
associate the demographic data related to the new identifier with the prior-existing identifier; and
remove the new identifier from an identifier index.

10. The system of claim 9, wherein the third party is a credit agency and the expanded demographic data are received in a credit header.

11. The system of claim 9, further operable to, in response to the updated matching confidence not satisfying the threshold:
determine whether the updated expanded demographic data are related to the given record associated with the prior-assigned identifier; and
in response to determining that the updated expanded demographic data are related to the given record associated with the prior-assigned identifier, merge the updated expanded demographic data related to the given record associated with the prior-assigned identifier into the given record.

12. The system of claim 9, further operable to, in response to removing the new identifier from the identifier index:
alert the requestor to the entity being associated with the prior-existing identifier.

13. The system of claim 9, wherein the expanded demographic data are periodically updated.

14. The system of claim 9, wherein the indexed demographic data include fields for each indexed entity of:
a first name;
a last name;
an address;
a governmental identification number; and
a date of birth.

15. The system of claim 14, wherein the demographic fields data omit one or more of the fields included in the indexed demographic data.

16. The system of claim 9, further operable to:
standardize the demographics fields data to a format used by the indexed demographic data; and
sanitize the demographics fields data to remove data fields whose values correspond to known invalid values.

17. A system for improving reliability in entity matching, comprising:
a processor; and
a memory storage device including instructions that when executed by the processor are operable to provide a matching system operable to receive identity requests for a given entity and produce an identifier response that includes an identifier for the given entity, the matching system including:
an index, storing indexed demographic data for entities, wherein each entity of the entities is associated with an identifier, and wherein the indexed demographic data include one or more indexed demographic data fields with one or more values that are associated with the entities;
a blocking system, operable to parse the identity requests for requesting demographic data fields and return blocks of candidate entities, wherein the candidate entities included in a given block match the requesting demographic data fields according to one or more values of the one or more indexed demographic data fields associated with the candidate entities; and
a matching engine, operable to determine a confidence score for each candidate entity included in the given block to determine whether a matching entity for the given entity is present in the given block, wherein when a matching entity is determined to be present in the given block, the identifier included in the identifier response is selected as a prior-existing identifier associated with the matching entity in the index, and wherein when a matching entity is determined to not be present in the given block, the identifier included in the identifier response is created as a new identifier which is associated with the given entity in the index, wherein the matching system:
in response to receiving updated expanded demographic data:
locates the new identifier:
retrieves demographic data related to the new identifier:
retrieves existing records that include prior-indexed demographic data, wherein at least one of the prior-indexed demographic data for each existing record retrieved matches a corresponding field from the demographic data related to the new identifier;
augments the prior-indexed demographic data with the updated expanded demographic data;
determines an updated matching confidence for whether the given entity is associated with a prior-existing identifier based on the demographic data related to the new identifier that match the prior-indexed demographic data as augmented by the updated expanded demographic data; and
in response to the updated matching confidence satisfying the threshold:
selects the prior-existing identifier as the identifier for the given entity;
associates the demographic data related to the new identifier with the prior-existing identifier; and
removes the new identifier from the index.

18. The system of claim 17, wherein each block of the blocks of candidate entities defines a different set of the requesting demographic data fields that the one or more values of the indexed demographic data fields are to match.

* * * * *